US011682166B2

(12) United States Patent
Le et al.

(10) Patent No.: US 11,682,166 B2
(45) Date of Patent: Jun. 20, 2023

(54) FITTING 3D PRIMITIVES TO A HIGH-RESOLUTION POINT CLOUD

(71) Applicant: ADOBE INC., San Jose, CA (US)

(72) Inventors: Eric-Tuan Le, London (GB); Duygu Ceylan Aksit, San Jose, CA (US); Tamy Boubekeur, Paris (FR); Radomir Meeh, Mountain View, CA (US); Niloy Mitra, Potters Bar (GB); Minhyuk Sung, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 17/201,783

(22) Filed: Mar. 15, 2021

(65) Prior Publication Data
US 2022/0292765 A1     Sep. 15, 2022

(51) Int. Cl.
*G06T 17/00*     (2006.01)
*G06N 3/045*     (2023.01)

(52) U.S. Cl.
CPC .............. *G06T 17/00* (2013.01); *G06N 3/045* (2023.01)

(58) Field of Classification Search
CPC ..................................................... G06T 17/00
See application file for complete search history.

(56) References Cited

U.S. PATENT DOCUMENTS

| | | | | |
|---|---|---|---|---|
| 9,836,885 B1 * | 12/2017 | Eraker | ............... | G06Q 30/0643 |
| 2009/0009513 A1 * | 1/2009 | van den Hengel | ..... | G06T 7/579 |
| | | | | 345/420 |
| 2014/0098094 A1 * | 4/2014 | Neumann | ............ | G06V 20/653 |
| | | | | 345/420 |
| 2022/0068024 A1 * | 3/2022 | Lin | ......................... | G06T 17/10 |

OTHER PUBLICATIONS

Li et al.; "GlobFit: Consistently Fitting Primitives by Discovering Global Relations"; ACM Transactions on Graphics, vol. 30, No. 4, Article 52, Jul. 2011, pp. 1-11. (Year: 2011).*

Chen, J., Lei, B., Song, Q., Ying, H., Chen, D. Z., & Wu, J. (2020). A Hierarchical Graph Network for 3D Object Detection on Point Clouds. In Proceedings of the IEEE/CVF Conference on Computer Vision and Pattern Recognition (pp. 392-401).

(Continued)

*Primary Examiner* — Michelle L Sams
(74) *Attorney, Agent, or Firm* — Shook, Hardy & Bacon L.L.P.

(57) ABSTRACT

Embodiments provide systems, methods, and computer storage media for fitting 3D primitives to a 3D point cloud. In an example embodiment, 3D primitives are fit to a 3D point cloud using a global primitive fitting network that evaluates the entire 3D point cloud and a local primitive fitting network that evaluates local patches of the 3D point cloud. The global primitive fitting network regresses a representation of larger (global) primitives that fit the global structure. To identify smaller 3D primitives for regions with fine detail, local patches are constructed by sampling from a pool of points likely to contain fine detail, and the local primitive fitting network regresses a representation of smaller (local) primitives that fit the local structure of each of the local patches. The global and local primitives are merged into a combined, multi-scale set of fitted primitives, and representative primitive parameters are computed for each fitted primitive.

20 Claims, 6 Drawing Sheets

(56) References Cited

OTHER PUBLICATIONS

Chen, S., Niu, S., Lan, T., & Liu, B. (2019). Large-scale 3D point cloud representations via graph inception networks with applications to autonomous driving. arXiv preprint arXiv:1906.11359.
Chen, Z., Tagliasacchi, A., & Zhang, H. (2020). Bsp-net: Generating compact meshes via binary space partitioning. In Proceedings of the IEEE/CVF Conference on Computer Vision and Pattern Recognition (pp. 45-54).
Deng, B., Genova, K., Yazdani, S., Bouaziz, S., Hinton, G., & Tagliasacchi, A. (2020). Cvxnet: Learnable convex decomposition. In Proceedings of the IEEE/CVF Conference on Computer Vision and Pattern Recognition (pp. 31-44).
Fischler, M. A., & Bolles, R. C. (1981). Random sample consensus: a paradigm for model fitting with applications to image analysis and automated cartography. Communications of the ACM, 24(6), 381-395.
Gadelha, M., Gori, G., Ceylan, D., Meeh, R., Carr, N., Boubekeur, T., . . . & Maji, S. (2020). Learning Generative Models of Shape Handles. In Proceedings of the IEEE/CVF Conference on Computer Vision and Pattern Recognition (pp. 402-411).
Genova, K., Cole, F., Sud, A., Sarna, A., & Funkhouser, T. (2020). Local deep implicit functions for 3d shape. In Proceedings of the IEEE/CVF Conference on Computer Vision and Pattern Recognition (pp. 4857-4866).
Genova, K., Cole, F., Vlasic, D., Sarna, A., Freeman, W. T., & Funkhouser, T. (2019). Learning shape templates with structured implicit functions. In Proceedings of the IEEE/CVF International Conference on Computer Vision (pp. 7154-7164).
Graham, B., Engelcke, M., & Van Der Maaten, L. (2018). 3d semantic segmentation with submanifold sparse convolutional networks. In Proceedings of the IEEE conference on computer vision and pattern recognition (pp. 9224-9232).
Han, L., Zheng, T., Xu, L., & Fang, L. (2020). Occuseg: Occupancy-aware 3d instance segmentation. In Proceedings of the IEEE/CVF conference on computer vision and pattern recognition (pp. 2940-2949).
Hu, Q., Yang, B., Xie, L., Rosa, S., Guo, Y., Wang, Z., . . . & Markham, A. (2020). Randla-net: Efficient semantic segmentation of large-scale point clouds. In Proceedings of the IEEE/CVF Conference on Computer Vision and Pattern Recognition (pp. 11108-11117).
Jiang, L., Zhao, H., Shi, S., Liu, S., Fu, C. W., & Jia, J. (2020). Pointgroup: Dual-set point grouping for 3d instance segmentation. In Proceedings of the IEEE/CVF Conference on Computer Vision and Pattern Recognition (pp. 4867-4876).
Kaiser, A., Ybanez Zepeda, J. A., & Boubekeur, T. (Feb. 2019). A survey of simple geometric primitives detection methods for captured 3D data. In Computer Graphics Forum (vol. 38, No. 1, pp. 167-196).
Kania, K., Zięba, M., & Kajdanowicz, T. (2020). UCSG-Net-Unsupervised Discovering of Constructive Solid Geometry Tree. arXiv preprint arXiv:2006.09102.
Laidlaw, D. H., Trumbore, W. B., & Hughes, J. F. (Aug. 1986). Constructive solid geometry for polyhedral objects. In Proceedings of the 13th annual conference on Computer graphics and interactive techniques (pp. 161-170).
Landrieu, L., & Simonovsky, M. (2018). Large-scale point cloud semantic segmentation with superpoint graphs. In Proceedings of the IEEE Conference on Computer Vision and Pattern Recognition (pp. 4558-4567).
Li, Y., Wu, X., Chrysathou, Y., Sharf, A., Cohen-Or, D., & Mitra, N. J. (2011). Globfit: Consistently fitting primitives by discovering global relations. In ACM SIGGRAPH 2011 papers (pp. 1-12).
Lin, C., Fan, T., Wang, W., & Nießner, M. (Aug. 2020). Modeling 3d shapes by reinforcement learning. In European Conference on Computer Vision (pp. 545-561). Springer, Cham.

Marr, D., & Nishihara, H. K. (1978). Representation and recognition of the spatial organization of three-dimensional shapes. Proceedings of the Royal Society of London. Series B. Biological Sciences, 200(1140), 269-294.
Paschalidou, D., Ulusoy, A. O., & Geiger, A. (2019). Superquadrics revisited: Learning 3d shape parsing beyond cuboids. In Proceedings of the IEEE/CVF Conference on Computer Vision and Pattern Recognition (pp. 10344-10353).
Qi, C. R., Su, H., Mo, K., & Guibas, L. J. (2017). Pointnet: Deep learning on point sets for 3d classification and segmentation. In Proceedings of the IEEE conference on computer vision and pattern recognition (pp. 652-660).
Qi, C. R., Yi, L., Su, H., & Guibas, L. J. (2017). Pointnet++: Deep hierarchical feature learning on point sets in a metric space. arXiv preprint arXiv:1706.02413.
Rethage, D., Wald, J., Sturm, J., Navab, N., & Tombari, F. (2018). Fully-convolutional point networks for large-scale point clouds. In Proceedings of the European Conference on Computer Vision (ECCV) (pp. 596-611).
Riegler, G., Osman Ulusoy, A., & Geiger, A. (2017). Octnet: Learning deep 3d representations at high resolutions. In Proceedings of the IEEE conference on computer vision and pattern recognition (pp. 3577-3586).
Schnabel, R., Wahl, R., & Klein, R. (Jun. 2007). Efficient RANSAC for point-cloud shape detection. In Computer graphics forum (vol. 26, No. 2, pp. 214-226). Oxford, UK: Blackwell Publishing Ltd.
Sharma, G., Goyal, R., Liu, D., Kalogerakis, E., & Maji, S. (2018). Csgnet: Neural shape parser for constructive solid geometry. In Proceedings of the IEEE Conference on Computer Vision and Pattern Recognition (pp. 5515-5523).
Sharma, G., Liu, D., Maji, S., Kalogerakis, E., Chaudhuri, S., & Měch, R. (Aug. 2020). Parsenet: A parametric surface fitting network for 3d point clouds. In European Conference on Computer Vision (pp. 261-276). Springer, Cham.
Smirnov, D., Fisher, M., Kim, V. G., Zhang, R., & Solomon, J. (2020). Deep parametric shape predictions using distance fields. In Proceedings of the IEEE/CVF Conference on Computer Vision and Pattern Recognition (pp. 561-570).
Tatarchenko, M., Park, J., Koltun, V., & Zhou, Q. Y. (2018). Tangent convolutions for dense prediction in 3d. In Proceedings of the IEEE Conference on Computer Vision and Pattern Recognition (pp. 3887-3896).
Tulsiani, S., Su, H., Guibas, L. J., Efros, A. A., & Malik, J. (2017). Learning shape abstractions by assembling Volumetric primitives. In Proceedings of the IEEE Conference on Computer Vision and Pattern Recognition (pp. 2635-2643).
Xu, Q., Sun, X., Wu, C. Y., Wang, P., & Neumann, U. (2020). Grid-gcn for fast and scalable point cloud learning. In Proceedings of the IEEE/CVF Conference on Computer Vision and Pattern Recognition (pp. 5661-5670).
Zou, C., Yumer, E., Yang, J., Ceylan, D., & Hoiem, D. (2017). 3d-prnn: Generating shape primitives with recurrent neural networks. In Proceedings of the IEEE International Conference on Computer Vision (pp. 900-909).
Oesau, S., Verdie, Y., Jamin, C., Alliez, P., Lafarge, F., & Giraudot, S. (2018). Point set shape detection. CGAL User and Reference Manual, 4, 59-66.
Gurobi Optimization, L. L. C. (2020). Gurobi optimizer reference manual. Gurobi Optimization Inc.
Kingman, D. P., & Ba, J. (2015). Adam: A Method for Stochastic Optimization. Conference paper. In 3rd International Conference for Learning Representations.
Sun, C. Y., Zou, Q. F., Tong, X., & Liu, Y. (2019). Learning adaptive hierarchical cuboid abstractions of 3d shape collections. ACM Transactions on Graphics (TOG), 38(6), 1-13.
Li, L., Sung, M., Dubrovina, A., Yi, L., & Guibas, L. J. (2019). Supervised fitting of geometric primitives to 3d point clouds. In Proceedings of the IEEE/CVF Conference on Computer Vision and Pattern Recognition (pp. 2652-2660).
Kuhn, H. W. (1955) The Hungarian method for the assignment problem. Naval research logistics quarterly, 2(1-2), 83-97.

* cited by examiner

US 11,682,166 B2

FITTING 3D PRIMITIVES TO A HIGH-RESOLUTION POINT CLOUD

BACKGROUND

A three-dimensional (3D) model can digitally represent an object or a collection of objects with a set of 3D points connected by lines, triangles, surfaces, or other means. 3D models are useful in a variety of fields such as film, animation, gaming, engineering, industrial design, architecture, stage and set design, and others. Sometimes, a 3D artist, designer, or other person will want to create a 3D model that digitally represents a particular reference object. One option to accomplish this is to create the 3D model manually. However, creating high-quality 3D models is a laborious task, requiring significant expertise in 3D sculpting, meshing, and texturing. In some cases, creating suitable 3D models is beyond the skill of the person who wants the model. For physical objects, another option is to perform a 3D scan of a 3D reference object. However, a 3D point cloud produced by a 3D scan is difficult to edit and often lacks intuitive structural detail, such as a composition of parts.

SUMMARY

Embodiments of the present invention are directed to techniques for fitting 3D primitives to a 3D point cloud. In an example embodiment, a set of 3D primitives are fit to a 3D point cloud using a cascaded primitive fitting network with a global primitive fitting network that evaluates the entire 3D point cloud and a local primitive fitting network that evaluates local patches formed by clusters of points from the 3D point cloud. The global primitive fitting network regresses a representation of larger (global) primitives that fit the global structure of the 3D point cloud. To identify smaller 3D primitives for regions of the 3D point cloud with fine detail, the 3D point cloud is processed to identify a pool of 3D points that are likely to represent fine detail, a set of local patches are constructed by sampling from the pool of points, and the local primitive fitting network regresses a representation of smaller (local) primitives that fit the local structure of each of the local patches. The representations of the global and local primitives are merged into a representation of a combined, multi-scale set of fitted primitives, and representative primitive parameters such as dimensions, angles, and/or positions are computed for each fitted primitive in the combined set. As such, various implementations of the present techniques can detect global primitives that represent course detail in global structures, as well as local primitives that represent fine detail in local structures, outperforming state-of-the-art fitting results on high-resolution point clouds, especially in regions of fine detail.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
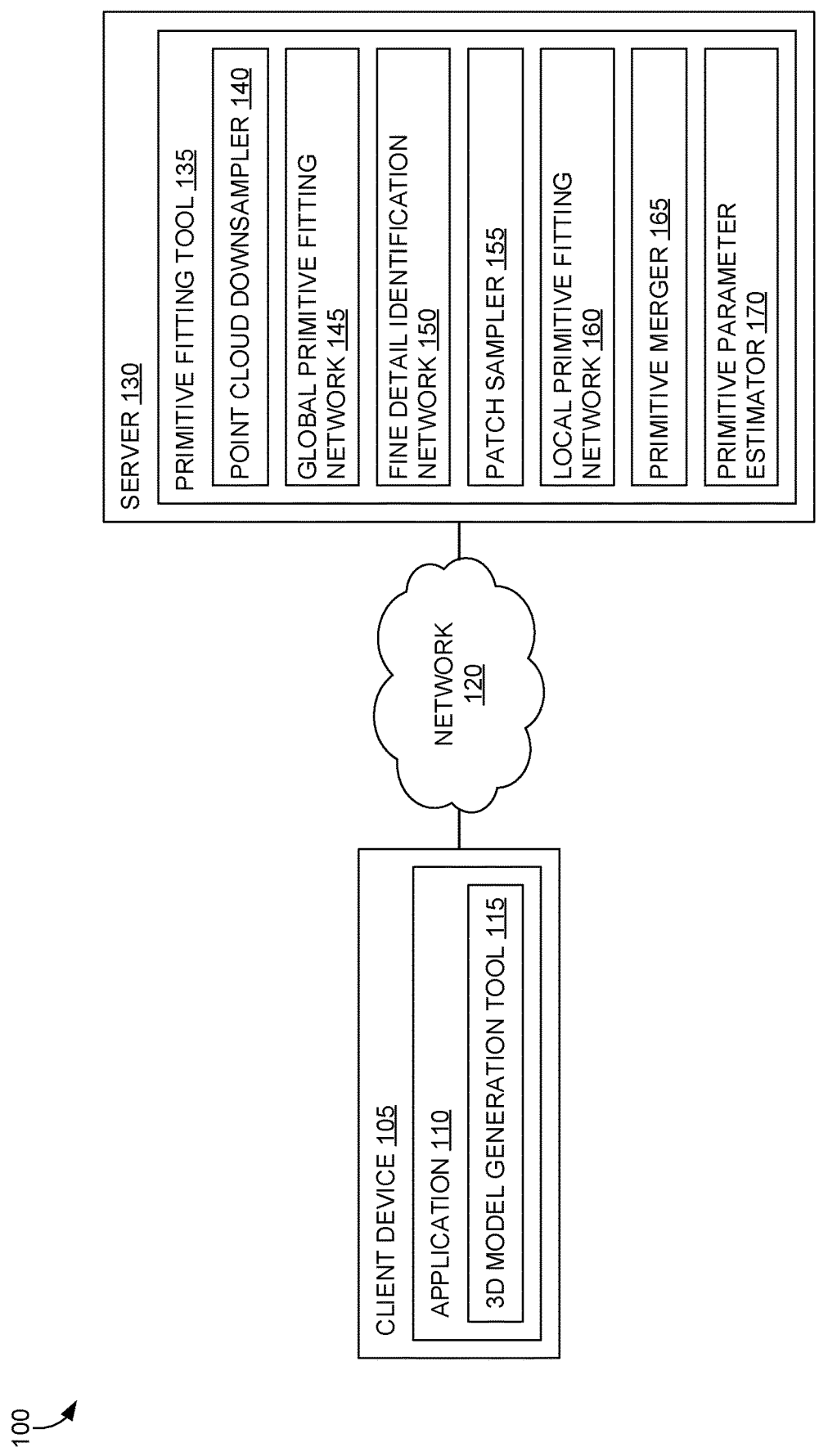
FIG. 1 is a block diagram of an example computing system suitable for fitting 3D primitives to a 3D point cloud, in accordance with certain embodiments.

Some prior techniques seek to represent a physical 3D object as a collection of 3D base geometric primitives ("primitives" or "3D primitives"), such as planes, cylinders, and cones. Initially, many human-made physical objects are designed as a composition of primitives. For example, a physical object might be designed using computer-aided design techniques such as Constructive Solid Geometry (CSG) or by building a binary tree of simple primitives. As a result, many human-made physical objects can be represented as a composition of primitives by first performing a 3D scan of a 3D reference object to generate a 3D point cloud, and then fitting 3D primitives to the 3D point cloud. Representing a 3D scan as a composition of primitives can help humans perceive structural detail, and can enable various editing capabilities in downstream applications. However, precisely fitting 3D primitives to a 3D point cloud is not easy. In the case of high-resolution 3D point cloud scans, one challenge is being able to detect both large-scale 3D primitives as well as smaller-scale 3D primitives representing small or detailed parts with fine detail.

One technique for primitive fitting is random sample consensus (RANSAC), which involves iteratively sampling points to generate candidate primitives and evaluating primitive fitting error against a threshold to accept or reject a candidate primitive. However, such an unsupervised approach often results in a combinatorial explosion due to the complexity of the problem. As a result, this iterative heuristic algorithm often cannot take into account all possible configurations, resulting in a sub-optimal fit. Furthermore, RANSAC can produce an undesired set of primitives by fitting to noise in the input. Although prior techniques attempt to address this noise to some extent with certain threshold parameters, the input-specific parameter tuning requires substantial manual effort.

Recently, learning-based techniques have been proposed to fit 3D primitives to a 3D point cloud. A recent work proposed a supervised learning-based framework called Supervised Primitive Fitting Network (SPFN) that learns a configuration of 3D primitives that represents a 3D point cloud. Instead of directly regressing representative primitive parameters such as dimensions, angles, or positions of 3D primitives, SPFN first predicts per-point features (association between each point and each primitive, primitive type, and surface normal), and a subsequent differentiable module computes representative primitive parameters by minimizing the fitting error. However, SPFN has limited accuracy and cannot efficiently handle high-resolution 3D point clouds. For example, the ability to process high-resolution 3D point clouds in a neural network with consumer GPUs can be limited by memory. For example, even with a relatively simple 3D point cloud processing architecture such as PointNet, memory limitations during training can limit input 3D point clouds to approximately 10 k points, whereas 3D point cloud scans may include 100 k to one million points. Simply downsampling a 3D point cloud results in the loss of fine detail. As a result, SPFN is not equipped to fit small 3D primitives that represent fine detail from high-resolution 3D point clouds.

Some recent work has focused on improving the capacity of neural networks to handle high-resolution 3D input data, particularly in the context of detecting objects from high-resolution 3D scans of indoor and outdoor scenes. Some prior work introduced networks that internally voxelize 3D point clouds to enable 3D convolutions. Although these architectures can perform scene segmentation, they are not suitable for primitive fitting since voxelization causes significant discretization errors. As an alternative to voxelization, another prior technique proposed exploiting two-dimensional (2D) convolutions based on projecting points in a local region to a tangent plane, but this architecture is sensitive to errors in surface normal estimation. Other previous work on neural point cloud processing proposed to cluster points and generate object candidates for instance segmentation or to concatenate hierarchical downsampling and upsampling modules as an encoder/decoder architecture for semantic segmentation. However, neither of these approaches is directly applicable to fitting problems that seek to leverage both global and local structure to fit larger 3D primitives that represent course detail in global structures, as well as smaller 3D primitives that represent fine detail in local structures.

Accordingly, embodiments of the present invention are directed to techniques for fitting 3D primitives to a 3D point cloud. In an example embodiment, a set of 3D primitives are fit to a 3D point cloud using a cascaded primitive fitting network with a global primitive fitting network that evaluates the entire 3D point cloud and a local primitive fitting network that evaluates local patches formed by clusters of points from the 3D point cloud. The global primitive fitting network regresses a representation of larger (global) primitives that fit the global structure of the 3D point cloud. To identify smaller 3D primitives for regions of the 3D point cloud with fine detail, the 3D point cloud is processed to identify a pool of 3D points that are likely to represent fine detail, a set of local patches are constructed by sampling from the pool of points, and the local primitive fitting network regresses a representation of smaller (local) primitives that fit the local structure of each of the local patches. The representations of the global and local primitives are merged into a representation of a combined, multi-scale set of fitted primitives, and representative primitive parameters such as dimensions, angles, and/or positions are computed for each fitted primitive in the combined set.

In some embodiments, a global primitive fitting network (e.g., SPFN) is trained on downsampled versions of 3D point clouds (e.g., to compensate for a high memory footprint of a point cloud processing backbone module). Although the trained global primitive fitting network can process a full-resolution 3D point cloud at inference time, it may miss fine details that are lost in the downsampling process during training. As such, in an embodiment, an additional instance of the base architecture of the global primitive fitting network (e.g., SPFN) is trained to operate on local patches of the full-resolution 3D point clouds. In some embodiments, the input architecture of the additional instance (the local primitive fitting network) is modified to accept global contextual information generated by the global primitive fitting network (e.g., a latent vector representing an entire 3D point cloud, a latent vector representing a seed point for a local patch) as an additional input. In some cases, in order to ensure the capacity of the local primitive fitting network is utilized to learn the prediction of local primitives, the local primitive fitting network is trained on ground truth local patches sampled from regions of ground truth point clouds known to contain such primitives (e.g., regions that represent fine detail). At inference time, since the regions of an input 3D point cloud that are likely to represent fine detail are unknown, a fine detail identification network predicts a representation of those regions, and corresponding patches are sampled and processed with the local primitive fitting network.

Given the predicted representations of the global and local primitives, in some embodiments, a merging algorithm uses these predictions as candidate primitives and aggregates and de-duplicates the candidate primitives across global and local scales. In an example implementation, the merging algorithm is formulated as a binary quadratic program that maximizes intersections of points common to candidate primitives that are assigned to the same final primitive. In some implementations, a solution to the binary quadratic program is modeled using a Hungarian algorithm. As such, the merging algorithm computes a representation of a combined, multi-scale set of fitted primitives. In some embodiments, representative primitive parameters such as dimensions, angles, and/or positions are computed for each fitted primitive in the combined set, and, a representation of the fitted primitives (e.g., a 3D model, a 3D segmentation) is generated and provided for downstream use.

As such, using various implementations described herein, 3D primitives can be fitted to a high-resolution point cloud generated by a 3D scan. In an example implementation, a global primitive fitting network fits global primitives to the full input point cloud, a local primitive fitting network fits local primitives to local patches of the input point cloud, and a merging algorithm assembles and de-duplicates substantially overlapping global and local predictions. Thus, various embodiments detect global primitives that represent course detail in global structures, as well as local primitives that represent fine detail in local structures, outperforming state-of-the-art fitting results on high-resolution point clouds, especially in regions of fine detail. As such, using various embodiments described herein, 3D primitives are identified more accurately and with finer detail than in prior techniques.

Example 3D Primitive Fitting Environment

Referring now to FIG. 1, a block diagram of example environment 100 suitable for use in implementing embodiments of the invention is shown. Generally, environment 100 is suitable for fitting 3D primitives to a 3D point cloud, and, among other things, facilitates generating a 3D model or 3D segmentation from a 3D point cloud. At a high level, environment 100 includes client device 105, network 120, and server 130. In the example illustrated in FIG. 1, client device 105 and server 130 communicate with each other via network 120. In some nonlimiting example implementations, network 120 includes one or more local area networks (LANs) and/or wide area networks (WANs). Such networking environments are commonplace in offices, enterprise-wide computer networks, intranets, and the Internet.

Depending on the implementation, client device 105 and/or server 130 are any kind of computing device capable of facilitating 3D primitive fitting. For example, in an embodiment, client device 105 and/or server 130 are each a computing device such as computing device 600 of FIG. 6. In some embodiments, client device 105 and/or server 130 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, client device 105 and/or server 130 comprise one or more data stores (or computer data memory). Further, although client device 105 and server 130 are each depicted as a single component, in some embodiments, client device 105 and/or server 130 include one or more corresponding data stores, and/or are implemented using cloud storage.

In the example illustrated in FIG. 1, client device 105 includes application 110 with 3D model generation tool 115, and server 130 includes 3D primitive fitting tool 135. In some embodiments, 3D model generation tool 115, 3D primitive fitting tool 135, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, 3D model generation tool 115 and 3D primitive fitting tool 135 coordinate via network 120 to execute the functionality described herein. In another example, 3D model generation tool 115 and 3D primitive fitting tool 135 (or some portion thereof) are integrated into a common application executable on a single device. In yet another example, 3D model generation tool 115 and 3D primitive fitting tool 135 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, assume a user operating client device 105 wants to generate a 3D model from a physical reference object. In some embodiments, the user operates a 3D scanner (e.g., a laser scanner or Digital Aerial Photogrammetry (DAP) scanner) to generate, or the user otherwise obtains, a 3D representation of the physical reference object, such as a 3D point cloud. However, the 3D point cloud may not be easy to edit. In some cases, the best 3D representation available is noisy, partial, or otherwise incomplete. Furthermore, the user may want to visualize a 3D segmentation of the 3D point cloud with its constituent parts. Therefore, in some cases, assume the user wants to generate a 3D model and/or a set of 3D primitives that reproduces, matches, and/or approximates the shape and/or proportions of the 3D point cloud.

Accordingly, in some embodiments, 3D model generation tool 115 provides an interface that allows the user to upload or otherwise designate the 3D point cloud, and 3D model generation tool 115 sends the 3D point cloud to 3D primitive fitting tool 135. Upon receiving the 3D point cloud, 3D primitive fitting tool 135 fits a set of 3D primitives to the 3D point cloud, generates a representation of the fitted 3D primitives (e.g., a 3D model, a 3D segmentation, a visualization thereof), and provides the representation of the fitted 3D primitives to 3D model generation tool 115 for downstream use. In an example embodiment that returns a 3D model that represents the fitted 3D primitives as different parts, application 110 includes editing functionality, such as those available in computer-aided design software, enabling the user to edit the 3D model, incorporate the 3D model into a project or design, or otherwise. In another example, application 110 provides a download interface through which the user downloads the 3D model, enabling the user to edit or import the 3D model in some other application. In yet another example, application 110 presents a visualization of the fitted 3D primitives as different parts or as a 3D segmentation. These are just a few examples, and other applications for fitted 3D primitives are contemplated within the scope of the present disclosure.

At a high level, 3D primitive fitting tool 135 accepts a representation of a 3D point cloud, fits a set of 3D primitives to the 3D point cloud, generates, and returns a 3D model or some other representation of the 3D primitives. In the example implementation illustrated in FIG. 1, 3D primitive fitting tool 135 includes point cloud downsampler 140, global primitive fitting network 145, fine detail identification network 150, patch sampler 155, local primitive fitting network 160, primitive merger 165, and primitive parameter estimator 170. In an embodiment, global primitive fitting network 145, fine detail identification network 150, and local primitive fitting network 160 each include one or more neural networks, which together (or in combination with other elements of primitive fitting tool 135) form a cascaded primitive fitting network. In operation (e.g., inference time), global primitive fitting network 145 processes the 3D point cloud to predict a representation of global 3D primitives. In an example embodiment, point cloud downsampler 140 downsamples the 3D point cloud and provides a downsampled version of the 3D point cloud to fine detail identification network 150, which predicts which points are likely to belong to regions of the 3D point cloud containing fine detail. Patch sampler 155 samples patches based on these points, and local primitive fitting network 160 processes each patch to predict a representation of corresponding local 3D primitives. Primitive merger 165 aggregates and de-duplicates the predicted global and local 3D primitives, and primitive parameter estimator 170 calculates values of representative primitive parameters for the final set of fitted 3D primitives.

Figure 2:
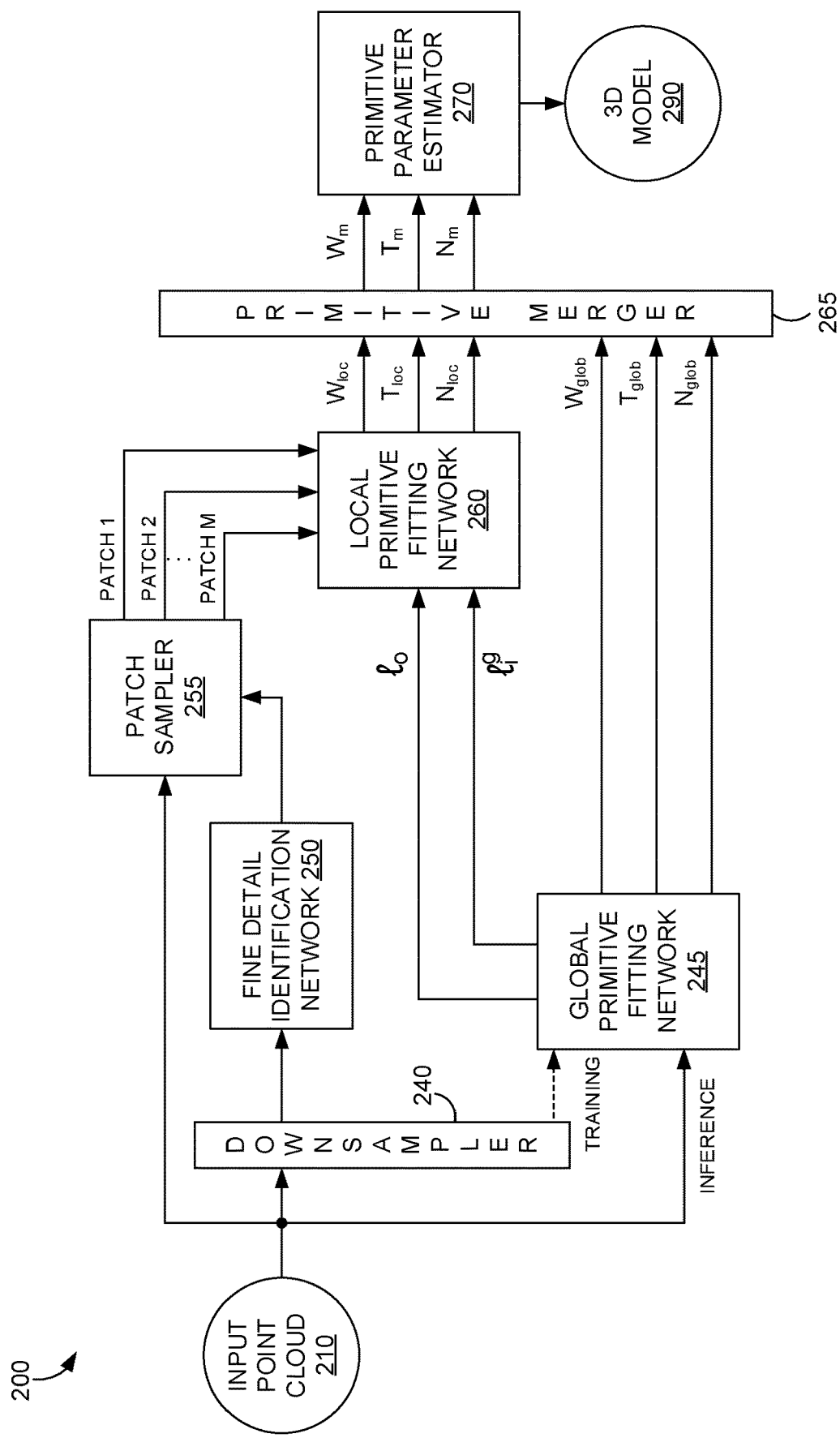
FIG. 2 is a data flow diagram illustrating an example primitive fitting tool, in accordance with certain embodiments.
Figure 3A:
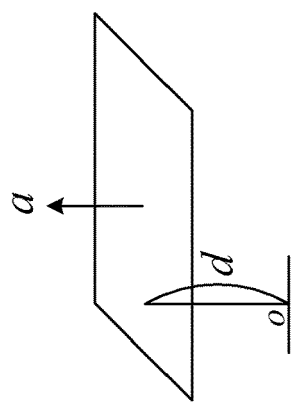
FIGS. 3A-3D are illustrations of example representative primitive parameters for example primitive types, in accordance with certain embodiments.
Figure 3B:
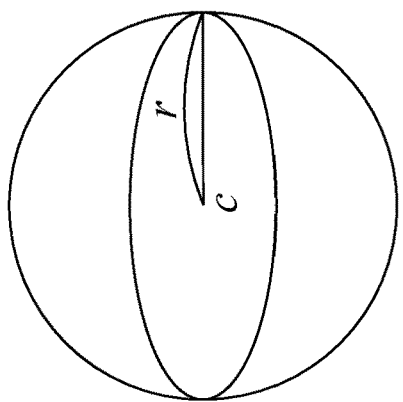
Figure 3C:
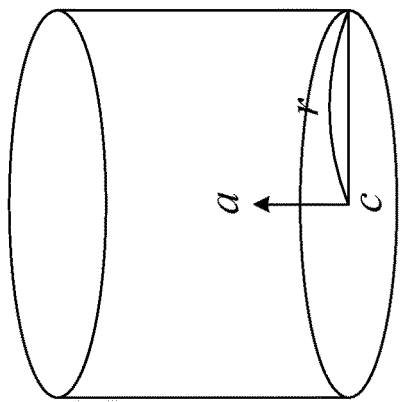
Figure 3D:
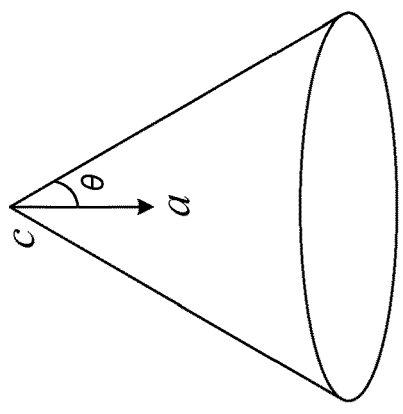

FIG. 2 is a data flow diagram illustrating an example primitive fitting tool 200, in accordance with certain embodiments. In an example implementation, primitive fitting tool 200 and its components correspond with primitive fitting tool 135 of FIG. 1 and its components. At a high level, 3D primitive fitting tool 200 accepts a representation of input point cloud 210, fits a set of 3D primitives to the 3D point cloud, generates, and returns 3D model 290 or some other representation of the 3D primitives. In the example implementation illustrated in FIG. 2, 3D primitive fitting tool 200 includes point cloud downsampler 240 (which corresponds to point cloud downsampler 140 of FIG. 1 in an embodiment), global primitive fitting network 245 (which corresponds to global primitive fitting network 145 of FIG. 1 in an embodiment), fine detail identification network 250 (which corresponds to fine detail identification network 150 of FIG. 1 in an embodiment), patch sampler 255 (which corresponds to patch sampler 155 of FIG. 1 in an embodiment), local primitive fitting network 260 (which corresponds to local primitive fitting network 160 of FIG. 1 in an embodiment), primitive merger 265 (which corresponds to primitive merger 165 of FIG. 1 in an embodiment), and primitive parameter estimator 270 (which corresponds to primitive parameter estimator 170 of FIG. 1 in an embodiment).

In an example implementation, global primitive fitting network 245, fine detail identification network 250, and/or local primitive fitting network 260 each comprise one or more neural networks, and primitive fitting tool 200 is trained as a sequential cascaded process. First, fine detail identification network 250 is trained on downsampled point clouds (e.g., n=8,192) to learn how to identify a point in small-scale primitive areas. Second, global primitive fitting network 245 is trained on the same downsampled point clouds that were used to train fine detail identification network 250. The output of global primitive fitting network 245 provides a course primitive decomposition of input point cloud 210 with course accuracy on small primitives. Third, local primitive fitting network 260 is trained to predict a fine primitive decomposition to improve on the course primitive decomposition. In some embodiments, fine detail identification network 250 is used to identify patches to train local primitive fitting network 260. In other embodiments, training patches for local primitive fitting network 260 are identified by randomly sampling patches from small, ground truth primitives without using fine detail identification network 250 (i.e., fine detail identification network 250 is only used at inference time when ground truth primitives are not available). In some embodiments, to provide both local and global context to local primitive fitting network 260, a patch latent vector generated by an encoder of local primitive fitting network 260 is augmented (e.g., concatenated) with an object latent vector and a patch centroid feature vector extracted by the trained global primitive fitting network 245 before feeding a combined representation into a decoder of local primitive fitting network 260.

In an example implementation at inference time, fine detail identification network 250 and global primitive fitting network 245 are run in parallel to generate, respectively, a representation of a pool of points likely to contain fine detail (e.g., a 3D heat map) and the course primitive decomposition. In contrast to some training implementations, in some embodiments, global primitive fitting network 245 operates on the full-resolution input point cloud 210. In an example implementation, the 3D heat map generated by fine detail identification network 250 represents predicted values (e.g., in [0, 1]) for each downsampled point, with higher values indicating a higher likelihood the point is part of a small primitive. Then, patch sampler 255 samples query points for patch centroids from a pool of points of the downsampled point cloud having predicted values in the 3D heat map above some threshold (e.g., θ=0.5), and patch sampler 255 generates corresponding patches of n points from the full-resolution input point cloud 210 (e.g., until all points in the pool are covered by at least one patch, until reaching a maximum number of patches, etc.). Local primitive fitting network 260 is then run on those newly sampled patches to refine the course fitting with smaller primitives. Primitive merger 265 then merges predicted local primitives (or segments) from the local patches and predicted global primitives (or segments) from global primitive fitting network 245 to generate a representation of the final primitive decomposition with improved performance on small primitives. Finally, primitive parameter estimator 270 calculates values of representative primitive parameters for each primitive in the final primitive decomposition.

In some embodiments, point cloud downsampler 240 downsamples high-resolution point clouds (e.g., on the order of n=100 k, 500 k, 1 m, or some other number of points) down to some lower-resolution (e.g., on the order of n=5 k, 10 k, 50 k, or some other number of points). In an example implementation, point cloud downsampler 240 downsamples using Farthest Point Sampling (FPS) to maximize the spread of the sampled points.

In some embodiments, global primitive fitting network 245 is implemented with a Supervised Primitive Fitting Network (SPFN), which includes a PointNet++ architecture that predicts per-point features $W_{glob}$, $T_{glob}$, and $N_{glob}$. The default PointNet++ implementation is designed as an encoder-decoder architecture. The encoder progressively decreases the point cloud resolution with depth, from the input resolution to 512, 128, and finally to a single point vector, and the decoder processes the single point vector. In an example embodiment, the last PointNet++ layers are replaced to produce three per-point outputs for point-to-primitive membership $W_{glob} \in \{0, 1\}^{N \times K_{glob}}$, per-point primitive type $T_{glob} \in [0, 1]^{N \times L}$, and unoriented point normals $N_{glob} \in \mathbb{R}^{N \times 3}$ from three dense layer heads, where N is the number of points in input point cloud 210, $K_{glob}$ is a maximum number of global primitives (corresponding to the maximum number of fitted primitives in the training dataset on which global primitive fitting network 245 was trained), and L is the number of primitive types. In an example implementation, $W_{i,k}$ represents whether point i belongs to primitive k, and the $k^{th}$ column of $W_{glob}$ represents which points belong to primitive k. In an example implementation, $K_{glob}=28$ and L=4 types of primitives: plane, sphere, cylinder, and cone.

In an example implementation, a training dataset that matches point clouds with ground truth primitive decompositions is used. In some embodiments, adjacent ground truth primitives with common representative primitive parameters are merged. Additionally or alternatively, small primitives (e.g., with a surface area or volume less than some percentage of the entire ground truth object, such as 0.5%) are removed from the set of ground truth primitives, and corresponding points are removed from ground truth point clouds. In some embodiments, ground truth point clouds are randomly perturbed with uniform noise (e.g., along the ground truth normal direction). In an example implementation, to train global primitive fitting network 245, predicted primitives are first mapped to ground truth primitives (e.g., using the Hungarian matching algorithm) to find the pairs of primitives that maximize the intersection over union across all paired primitives, and one or more per-point and/or per-primitive losses are computed based on this correspondence. Example per-point losses include normal loss $L_{norm}$, and primitive type loss $L_{type}$. Example per-primitive losses include segmentation loss $L_{seg}$, residual loss $L_{res}$, (i.e., fitting loss), and axis loss $L_{axis}$ (e.g., that considers the normal of a plane or the axis of a cylinder or a cone). In an example embodiment, a combined loss is computed based on a combination of different types of losses (e.g., $L_{seg}+L_{norm}+L_{type}+L_{res}+L_{axis}$), and the combined loss is used (e.g., backpropagated) to update the network.

In an example implementation, segmentation loss, normal loss, primitive type loss, residual loss, and/or axis loss are computed using known techniques. In an example implementation of segmentation loss, segmentation loss is computed based on Relaxed Intersection over Union (RIoU) and summed over each pair of ground truth primitive (represented by ground truth per-point membership $W_{:,k}$) and corresponding predicted primitive (represented by predicted per-point membership $$\hat{W}_{:,k}): L_{seg} = \frac{1}{K}\sum_{k=1}^{K}(1 - RIoU(W_{:,k}, \hat{W}_{:,k})).$$

In an example implementation of normal loss, normal loss is computed based on the absolute cosine angle between ground truth normal $\hat{N}_{i,:}$ and predicted normal $$N_{i,:}: L_{norm} = \frac{1}{N}\sum_{i=1}^{N}(1 - |N_{i,:}^T \hat{N}_{i,:}|).$$

In an example implementation of primitive type loss, primitive type loss is computed based on the cross entropy H between ground truth per-point primitive types $\hat{T}_{i,:}$ and predicted per-point primitive types $$T_{i,:}: L_{type} = \frac{1}{N}\sum_{i=1}^{N} 1(W_{i,:} \neq 0) H(T_{i,:}, \hat{T}_{i,:}),$$

where $1(.)$ is the indicator function so that unassigned points are ignored. In an example implementation of residual loss, residual loss is computed based on expected squared distance between ground truth bounded primitive surface $S_k$ and a predicted primitive k parameterized by $$\hat{A}_k: L_{res} = \frac{1}{K}\sum_{k=1}^{K} \mathbb{E}_{p\sim U(S_k)} D_{t_k}^2(p, \hat{A}_k),$$

where $\mathbb{E}_{p\sim U(S_k)}$ indicates a uniform sampling on the bounded surface S when taking the expectation, and $D_{t_k}^2(p,\hat{A}_k)$ is the squared distance from p to a primitive of a corresponding type/parameterized by $\hat{A}$. In an example implementation of axis loss, axis loss is computed based on cosine angle loss:

$$L_{axis} = \frac{1}{K}\sum_{k=1}^{K}(1 - \Theta_{t_k}(A_k, \hat{A}_k)),$$

where $\Theta_{t_k}(A_k, \hat{A}_k) = |a^T\hat{a}|$ for a plane (where a and â are ground truth and predicted normal vectors), cylinder (where a and â are ground truth and predicted center axis vectors), and cone (where a and â are ground truth and predicted center axis vectors), and $\Theta_{t_k}(A_k, \hat{A}_k)=1$ for a sphere (so the loss becomes zero).

In some embodiments, fine detail identification network 250 predicts a representation of points from a downsampled point cloud that are likely to contain fine detail. In an example implementation, fine detail identification network 250 includes a PointNet++ architecture that predicts a binary classification value for each point in the downsampled point cloud. By way of nonlimiting example, the last layers in the default PointNet++ implementation are replaced with a dense layer head that outputs a classification tensor $\in [0, 1]^N$ representing a small primitive heatmap, where higher values represent a higher likelihood the point is part of a region with fine detail (e.g., and therefore should be fitted with a small primitive). In some embodiments, the predicted classification values are binarized based on some threshold (e.g., θ=0.5), and/or points with predicted classification values above the threshold are placed or otherwise designated in a pool of points that are likely to contain fine detail.

In an example implementation of training, ground truth local patches are generated using full-resolution and downsampled ground truth point clouds. More specifically, query points are sampled from the downsampled ground truth point clouds at positions of small ground truth primitives (e.g., a primitive with less than η·N points, where there are Npoints in the entire ground truth object, and 0<η<1). In some embodiments, η is about 1-5%. From the query points, ground truth local patches are extracted from the high resolution point cloud. Continuing with an example implementation of training, fine detail identification network 250 is trained using binary cross-entropy loss: $L_{cross}=-\Sigma_{i=1}^{n}((y_i \log(p_i)+(1-y_i)\log(1-p_i))$, where $y_i$ is a binary ground truth value indicating whether point i belongs to a small primitive or not (based on a particular value of η), and $p_i$ is the predicted classification value for point i.

In an example embodiment at inference time (and in some embodiments to generate ground truth patches to train local primitive fitting network 260), patch sampler 255 randomly samples query points from this pool and, for each sampled point, generates a corresponding local patch of n points by grouping the n nearest neighbors (e.g., from the full-resolution input point cloud 210) into a patch of points. In some embodiments, when a local patch is constructed from a sampled query point (e.g., a patch centroid), the size of the pool is reduced by removing the sampled query point and/or any points in the local patch that were in the pool, and patch sampler 255 samples subsequent query points from the reduced pool until one or more designated completion criterion are met (e.g., continue until a maximum number of patches such as 32 is sampled, until all points in the pool are assigned to a local patch). In some embodiments, if one or more designated completion criterion are met and there are still points remaining in the pool, each remaining point is assigned to a corresponding closest local patch. As a result, patch sampler 255 generates a representation of M local patches. In some embodiments, patch sampler 255 translates each local patch to center it at the origin and scales each local patch to the unit sphere (which makes it easier for local primitive fitting network 260 to learn).

In some embodiments, local primitive fitting network 260 is implemented with a Supervised Primitive Fitting Network (SPFN), which includes a PointNet++ architecture that predicts point-to-primitive membership $W_{loc}$, per-point primitive type $T_{loc}$, and unoriented point normals $N_{loc}$ for each local patch. In an example implementation, $W_{loc} \in \{0, 1\}^{n \times K_{loc}}$, $N_{loc} \in \mathbb{R}^{n \times 3}$, and $T_{loc} \in [0, 1]^{n \times L}$, where the local patch has n points, $K_{loc}$ is a designated maximum number of local primitives (e.g., 21), and L is the number of primitive types.

In some embodiments, to provide both local and global context to local primitive fitting network 260, global contextual information extracted by global primitive fitting network 245 is provided as an additional input to local primitive fitting network 260. By way of nonlimiting example, an example implementation of global primitive fitting network 245 includes an encoder that extracts an object latent vector $l_o$ from input point cloud 210 and a decoder that decodes the object latent vector $l_o$ into a feature vector for each point. For a given local patch, the patch's seed point (e.g., the query point that was sampled from the pool of points and serves as a patch centroid) is used to identify a corresponding patch centroid feature vector $l_i^g$ (or seed point feature vector) generated by the decoder of global primitive fitting network 245. An example implementation of local primitive fitting network 260 includes an encoder that extracts a patch latent vector $l_i$ from a local patch and a decoder that decodes a combined representation $l'_i$ of $l_i$, $l_o$, and $l_i^g$ into corresponding per-point features. In an example embodiment, $l'_i$ is formed by concatenating the patch latent vector $l_i$, the object latent vector $l_o$, and the patch centroid feature vector $l_i^g$. Providing additional global contextual information serves to boost the performance of local primitive fitting network 260.

In some embodiments, local primitive fitting network 260 is trained using ground truth patches identified by fine detail identification network 250 and generated by patch sampler 255. In other embodiments, since ground truth primitives are available during training, local primitive fitting network 260 is trained using ground truth patches sampled from ground truth small primitives. In an example implementation, ground truth local patches are sampled from points of ground truth point clouds that belong to small ground truth primitives (e.g., a primitive with less than η·N points, where there are N points in the entire ground truth object, and 0<η<1). For example, a pool of points is generated or otherwise designated with points from a downsampled ground truth point cloud that belong to any small primitive, query points are sampled from the pool, and for each sampled query point, a corresponding patch of n points is generated using an n-nearest neighbor search (e.g., of the full-resolution ground truth point cloud). In an example implementation, the sampling process stops when one or more designated completion criterion are met (e.g., continue until a maximum number of patches such as 32 is sampled, until all points in the pool are assigned to a local patch). In some embodiments, the sampled patches are centered at the origin and scaled to the unit sphere. The resulting ground truth patches are used to generate corresponding input training data and ground truth per-point output features, and in some embodiments, one or more loss functions (e.g., segmentation loss, normal loss, primitive type loss, residual loss, and/or axis loss) are used to update local primitive fitting network 260.

In some embodiments, primitive merger 265 merges local primitives predicted from the local patches and global primitives predicted from the full input point cloud 210 to generate a representation of the final primitive decomposition. In an example implementation, global primitives are represented by global per-point features $W_{glob}$, $T_{glob}$, and $N_{glob}$, local primitives are represented by a set of local per-point features $W_{loc}$, $T_{loc}$, and $N_{loc}$ for each local patch, and primitive merger 265 generates a merged set of fitted primitives represented by merged features $W_m$, $T_m$, and $N_m$.

With respect to local fitted primitives, note that local primitive fitting network 260 predicts a maximum of $K_{loc}$ fitted segments. In an example merging technique, the per-point membership predictions for the $i^{th}$ local patch are represented with a local membership probability matrix, $W_{loc}^i \in [0,1]^{N \times K_{loc}}$ defined over all N input points:

$$W_{loc}^i = \begin{pmatrix} p_{1,1}^i & p_{1,2}^i & \cdots & p_{1,K_{loc}}^i \\ p_{2,1}^i & p_{2,2}^i & \cdots & p_{2,K_{loc}}^i \\ \vdots & \vdots & & \vdots \\ p_{N,1}^i & p_{N,2}^i & \cdots & p_{N,K_{loc}}^i \end{pmatrix} \quad \text{(Eq. 1)}$$

with $p_{a,b}^i = \mathbb{P}(P_a \in S_b^i)$, $a \in \{1, \ldots, N\}$, $b \in \{1, \ldots, K_{loc}\}$, denoting the probability of point a belonging to fitted segment b. Note that a point that does not belong to the patch has zero probability. With respect to global fitted primitives, note that global primitive fitting network 245 predicts a maximum of $K_{glob}$ fitted segments, which is represented in a similar global membership probability matrix, $W_{glob}$. Then, each of the local membership probability matrices for the M local patches and the global membership probability matrix are stacked:

$$W = [W_{loc}^1 W_{loc}^2 \ldots W_{loc}^M W_{glob}] \quad \text{(Eq. 2)}$$

In some embodiments, the goal of primitive merging is to compute a one-to-many relationship between a final set of fitted primitives and the individually predicted global and local primitives (segmentations). Assuming there are a total of $K_m$ primitives in the final decomposition, this relationship can be written as a binary merging matrix C that maps the maximum $K_{glob} + M \cdot K_{loc}$ global and local primitives to a final set of $K_m$ fitted primitives:

$$C \in \{0,1\}^{K_m \times (M \cdot K_{loc} + K_{glob})} \quad \text{(Eq. 3)}$$

In some embodiments, the optimum assignments (values) in the binary merging matrix C that map the individually predicted primitives (segmentations) to the final set of primitives are determined based on one or more designated constraints. In an example constraint, each predicted primitive (segment) should be mapped to exactly one final primitive:

$$C^T \mathbb{1}_{K_m} = \mathbb{1}_{M \cdot K_{loc} + K_{glob}} \quad \text{(Eq. 4)}$$

where $\mathbb{1}_x$ denotes a vector of ones of size x. In another example constraint, two primitives (segments) predicted from the same local patch (or from the full-resolution input point cloud 210) should not be merged under the assumption that the corresponding prediction network will avoid over-segmentation:

$$CA \leq \mathbb{1}_{K_m \times (M+1)}, \quad \text{(Eq. 3)}$$

where $A \in [0, 1]^{(M \cdot K_{loc} + K_{glob}) \times (M+1)}$ is a matrix representing the association between $M \cdot K_{loc} + K_{glob}$ predicted primitives (segments) and which of the corresponding M+1 regions (e.g., local patches or the full-resolution input point cloud 210) a primitive was predicted from. Note the example constraint of equation 3 ensures primitives from the same patch are not merged because otherwise the product (e.g., a matrix multiplication of vectors of ones) would be above one.

In some embodiments, two primitives (segments) $S_k^i$ and $S_l^j$ predicted from patches i and j are assigned to (e.g., merged into) the same final primitive if they have a substantial amount of overlap (e.g., measured as the number of points that belong to both segments). Note that $I=W^TW$ represents the intersections between segments as sums of joint probabilities for each point. As such, in some embodiments, the values of the binary merging matrix C are determined by maximizing:

$$\Sigma_{i,j} I_{ij}(C^TC)_{ij} = tr(IC^TC),\qquad\text{(Eq. 4)}$$

meaning that the point intersections between primitives (segments) assigned to the same final primitive is maximized.

In some embodiments, in order to account for constraints, values of an optimized binary merging matrix C* are assigned by solving an example binary quadratic programming problem:

$$C^* = \mathrm{argmax}_c\, tr(IC^TC)$$

$$\text{s.t. } C^T \mathbb{1}_{K_m} = \mathbb{1}_{M\cdot K_{loc} + K_{glob}}, \text{ and}$$

$$CA \leq \mathbb{1}_{K_m \times (m+1)} \qquad\text{(Eq. 5)}$$

In some embodiments, primitive merger 265 computes values of the binary merging matrix C by solving equation 5. In another implementation, primitive merger 265 instead finds the optimum $C^TC$ (a matrix indicating whether two segments are merged or not) rather than the optimum C*, which becomes a binary semidefinite programming problem.

In some embodiments, to reduce the amount of time it takes to solve either the binary quadratic or semidefinite programming problem, primitive merger 265 models the solution by applying a heuristic based on the Hungarian algorithm. More specifically, primitive merger 265 finds the element in I that corresponds to the pair of primitives (segments) with the greatest intersection, and sets the corresponding indices in $C^TC$ with a value (e.g., 1) indicating the corresponding pair of primitives (segments) is merged. Furthermore, primitive merger 265 identifies pairs of primitives (segments) that would violate the designated constraints (e.g., do not merge primitives predicted from the same local patch) and sets corresponding elements in I to a value (e.g., zero) indicating the corresponding pair of primitives (segments) is not merged. This process is repeated until there are no more primitives (segments) that can be merged without violating a constraint.

Having solved for $C^TC$, primitive merger 265 computes optimal binary merging matrix C* from $C^TC$. Note $C^TC$ represents whether two primitives (segments) should be merged, for example, as a matrix of values [0,1], where a value of one indicates that the primitives (segments) represented by a corresponding row and column should be merged, and a value of zero indicates that the primitives (segments) represented by a corresponding row and column should not be merged. As such, in an example implementation, primitive merger 265 identifies which primitives should be merged by reading from corresponding elements of $C^TC$, and fills in corresponding values of $C^* \in \{0, 1\}^{K_m \times (m\cdot K_{loc}+K_{glob})}$ to assign groups of primitives to a single merged primitive.

In some embodiments, having identified which primitives should be combined to form a final merged set of fitted primitives, primitive merger 265 computes a representation of the fitted primitives, such as merged primitive features $W_m$, $T_m$, and $N_m$. In an example implementation, merged per-point membership $W_m \in \{0, 1\}^{N \times K_m}$ represents which of the N points in input point cloud 210 are assigned to which of the final primitives $K_m$. In some embodiments, $W_m$ is computed as:

$$W_m = W | C^{*T} |^{\wedge},\qquad\text{(Eq. 6)}$$

where $X^\wedge$ is a column-wise l1-normalization of X. In some embodiments, $W_m$ represents association scores between each point and each final primitive, and the primitive with the highest score is chosen for each point.

In an example implementation, merged primitive types $T_m \in [0, 1]^{K_m \times L}$ represents a predicted primitive type for all primitives $K_m$. For each unique primitive represented in $W_m$, primitive merger 265 identifies from $W_m$ which points are in a given primitive. For each of those points, primitive merger 265 looks up the corresponding point probabilities in $T_{glob}$ and the M instances of $T_{loc}$ that the point belongs to a particular type of a primitive, sums the probabilities that each point in the primitive belongs to a primitive of a particular type, and combines (e.g., averages) over multiple prediction instances (e.g., global and local predictions) to compute a probability that each unique primitive is a particular type. Primitive merger 265 takes the highest probability for a particular primitive and assigns that primitive to a corresponding primitive type.

In an example implementation, merged per-point normals $N_m \in \mathbb{R}^{N \times 3}$ represents a predicted surface normal vector for each point. For each point, primitive merger 265 looks up the predicted surface normals for the point from $N_{glob}$ and any of the M instances of $N_{loc}$ where the point was part of a corresponding local patch, and primitive merger 265 merges (e.g., averages) the surface normals for the point to approximate a surface normal for the point. In some embodiments where patch sampler 255 transforms each local patch to the origin and the unit sphere, primitive merger 265 (or some other component) accounts for these transformations in the merged per-point normals $N_m$ (e.g., by applying to each predicted surface normal in $N_{loc}$ a transformation that reverses the transformation to the corresponding local patch, prior to merging surface normals into $N_m$).

In some embodiments, primitive parameter estimator 270 calculates values of representative primitive parameters $\{A_{k_m}\}$ for each of the $k_m$ primitives in the merged set of fitted primitives (the final primitive decomposition). In an example implementation, there are different representative primitive parameters for each of the L primitive types. FIGS. 3A-3D are illustrations of example representative primitive parameters for four example primitive types: plane, sphere, cylinder, and cone. In the example implementation illustrated in FIG. 3A, a plane is represented by $A_{plane}=(a, d)$, where a is its normal and d is its displacement from the origin. In the example implementation illustrated in FIG. 3B, a sphere is represented by $A_{sphere}=(c, r)$, where c is its center point and r is its radius. In the example implementation illustrated in FIG. 3C, a cylinder is represented by $A_{cylinder}=(c, r, a)$, where c is its center point, r is its radius, and a is its center axis vector. In the example implementation illustrated in FIG. 3D, a cone is represented by $A_{cone}=(c, a, \theta)$, where c is its apex point, a is its axis vector, and $\theta$ is its cone angle.

In an example implementation, primitive parameter estimator 270 calculates values of representative primitive parameters based on primitive type using known techniques. For example, primitive parameter estimator 270 solves for the values of $A_{k_m}$ by minimizing a distance metric, such as a distance between points in input point cloud 210 and its fitted primitives $\{A_{k_m}\}$.

In an example implementation for a plane, primitive parameter estimator 270 solves for $A_{plane}$ (a, d) by minimizing a weighted sum of squared distances $a^T p - d$ for each point p (e.g., in input point cloud, in primitive $A_{k_m}$). In some embodiments, this problem is solved by minimizing:

$$\varepsilon_{plane}(A,P,w) = \Sigma_{i=1}^{N} w_i (a^T P_{i,:} - d)^2, \quad \text{(Eq. 7)}$$

where $P_{i,:}$ is the $i^{th}$ point in input point cloud 210, $w_i$ is the $i^{th}$ row of $W_m$, and $\|a\|=1$. In some embodiments, d is solved by setting the derivative of equation 7 to zero, and minimizing equation 7 over a is solved as a homogeneous least squares problem.

In an example implementation for a sphere, primitive parameter estimator 270 solves for $A_{sphere} = (c, r)$ by minimizing a weighted sum of squared distances:

$$\varepsilon_{sphere}(A,P,w) = \Sigma_{i=1}^{N} w_i (\|P_{i,:} - c\|^2 - r_2)^2 \quad \text{(Eq. 8)}$$

In some embodiments, r is solved by setting the derivative of equation 8 to zero, minimizing equation 8 over c as a homogeneous least squares problem via Cholesky factorization.

In an example implementation for a cylinder, primitive parameter estimator 270 solves for $A_{cylinder} = (c, r, a)$ by first estimating center axis vector a and then fitting a circle to calculate values for r and c. In some embodiments, primitive parameter estimator 270 solves for a by minimizing:

$$\varepsilon_{cylinder}(a, N_m, w) = \|(\text{diag}(w))^{1/2} N_m a\|^2, \quad \text{(Eq. 9)}$$

where $N_{m_{i,:}}$ is the $i^{th}$ normal in $N_m$. With the center axis vector a known, projecting the points of the cylinder onto a plane with a normal that passes through the origin forms a circle, so primitive parameter estimator 270 solves for values of c and r to best fit a circle to the projected points, for example, using equation 8.

In an example implementation for a cone, primitive parameter estimator 270 solves for $A_{cone} = (c, a, \theta)$ by first estimating a and c, then $\theta$. For example, primitive parameter estimator 270 solves for apex point c as the intersection point of all tangent planes of the cone, in an implementation, by minimizing the following as a least squares problem:

$$\varepsilon_{cone}(c, \hat{N}) = \left\|(\text{diag}(w))^{\frac{1}{2}}(Nc - y)\right\|^2, \quad \text{(Eq. 10)}$$

where $y_i = N_{m_{i,:}}^T P_{i,:}$. Primitive parameter estimator 270 solves for a by fitting a plane that passes through the normal of all points on the cone and taking its unit normal as a (flipping the sign if it points away from the cone). Primitive parameter estimator 270 solves for $\theta$ as a weighted average:

$$\theta = \frac{1}{\sum_{i=1}^{N} w_i} \sum_{i=1}^{N} w_i \arccos\left|a^T \frac{P_{i,:} - c}{\|P_{i,:} - c\|}\right|. \quad \text{(Eq. 11)}$$

As such, primitive parameter estimator 270 calculates values of representative primitive parameters for each primitive in the merged set of fitted primitives. In some embodiments, primitive fitting tool 200 (or some other component) packages the fitted primitives into a suitable representation (e.g., a 3D model, a 3D segmentation, a visualization thereof), and provides the representation of the fitted primitives to 3D model generation tool 115 for downstream use.

Example Flow Diagrams

Figure 4:
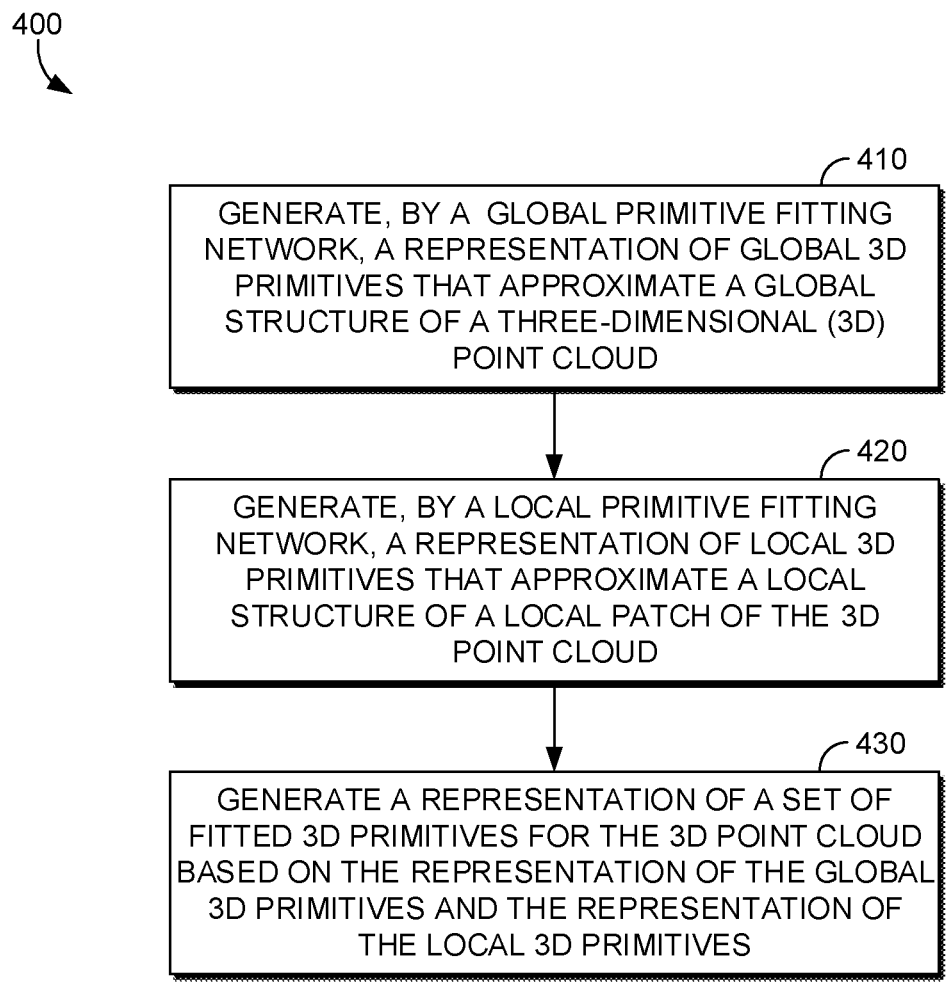
FIG. 4 is a flow diagram showing a method for fitting 3D primitives to a 3D point cloud based on global 3D primitives and local 3D primitives, in accordance with certain embodiments.
Figure 5:
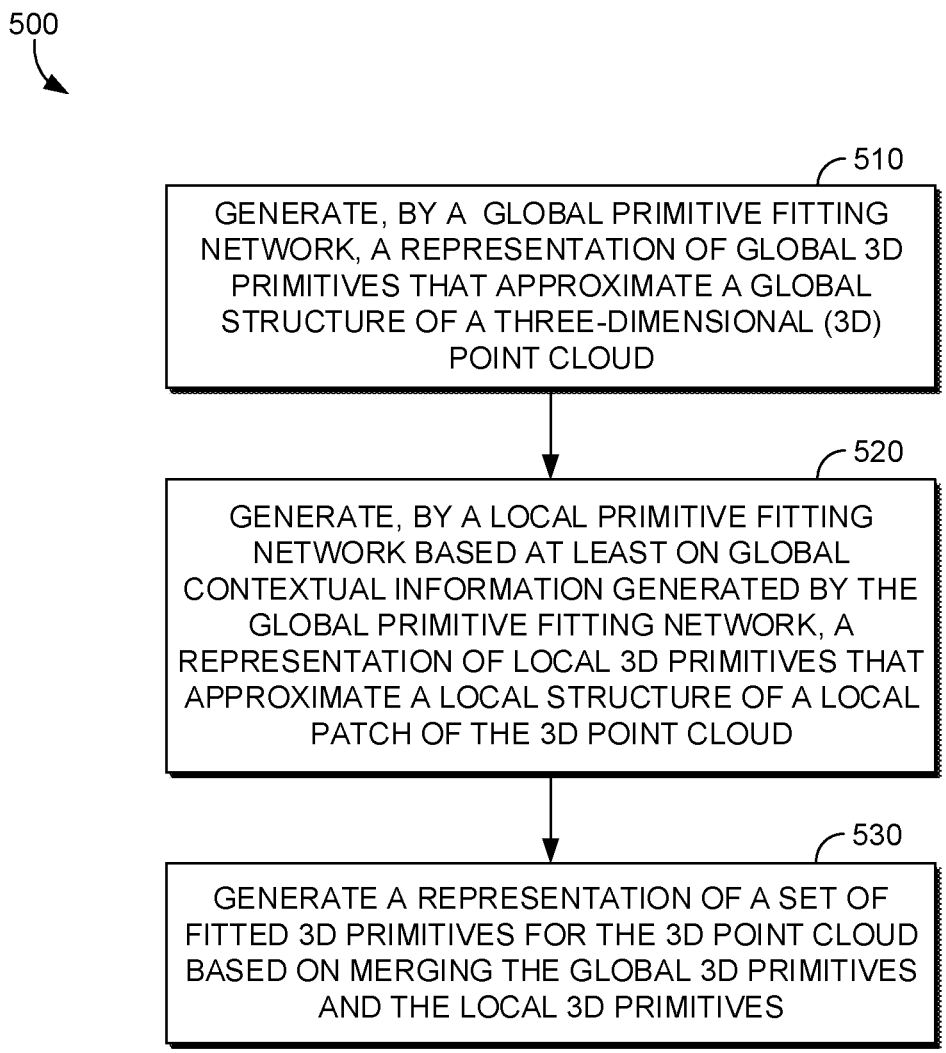
FIG. 5 is a flow diagram showing a method for merging global 3D primitives and local 3D primitives, in accordance with certain embodiments.

With reference now to FIGS. 4-5, flow diagrams are provided illustrating various methods for fitting 3D primitives to a 3D point cloud. Each block of the methods 400 and 500 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 4, FIG. 4 illustrates a method 400 for fitting 3D primitives to a 3D point cloud based on global 3D primitives and local 3D primitives. Initially at block 410, a global primitive fitting network generates a representation of global 3D primitives that approximate a global structure of a three-dimensional (3D) point cloud. For example, global primitive fitting network 245 of FIG. 2 predicts per-point features $W_{glob}$, $T_{glob}$, and $N_{glob}$ that represent global 3D fitted primitives. At block 420, a local primitive fitting network generates a representation of local 3D primitives that approximate a local structure of a local patch of the 3D point cloud. For example, local primitive fitting network 260 generates per-point features $W_{loc}$, $T_{loc}$, and $N_{loc}$ that represent local 3D fitted primitives for each local patch sampled from a 3D point cloud. At block 430, a representation of a set of fitted 3D primitives for the 3D point cloud is generated based on the representation of the global 3D primitives and the representation of the local 3D primitives. For example, primitive merger 265 of FIG. 2 merges local 3D primitives and global 3D primitives into a final primitive decomposition, and generates merged primitive features $W_m$, $T_m$, and $N_m$ representing the merged 3D primitives.

Turning now to FIG. 5, FIG. 5 illustrates a method 500 for merging global 3D primitives and local 3D primitives. Initially at block 510, a global primitive fitting network generates a representation of global 3D primitives that approximate a global structure of a three-dimensional (3D) point cloud. At block 520, a local primitive fitting network generates a representation of local 3D primitives that approximate a local structure of a local patch of the 3D point cloud based at least on global contextual information generated by the global primitive fitting network. For example, the global contextual information may include a latent vector representing the entire 3D point cloud and/or a latent vector representing a seed point for the local patch. At block 530, a representation of a set of fitted 3D primitives for the 3D point cloud is generated based on merging the global 3D primitives and the local 3D primitives.

Example Operating Environment

Figure 6:
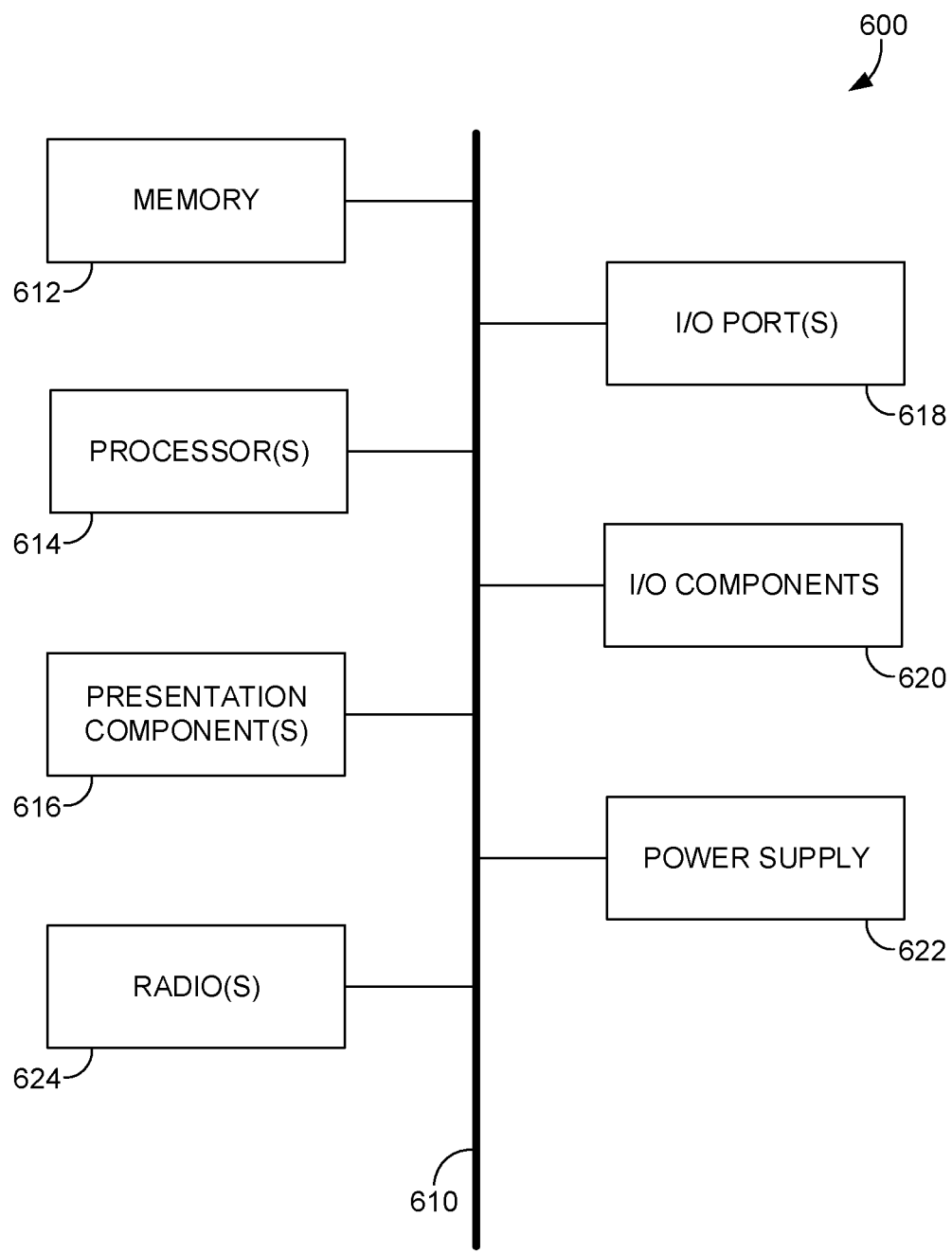
FIG. 6 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in some cases, it is not possible to delineate clear boundaries for different components. In this case, metaphorically, the lines would be grey and fuzzy. As such, the diagram of FIG. 6 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 6 and a "computing device."

Computing device 600 typically includes a variety of computer-readable media. Computer-readable media can be any available media that can be accessed by computing device 600 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Example presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 600. In some cases, computing device 600 is equipped with depth cameras, such as stereoscopic camera systems, infrared camera systems, RGB camera systems, touchscreen technology, and combinations of these, for gesture detection and recognition. Additionally or alternatively, the computing device 600 is equipped with accelerometers or gyroscopes that enable detection of motion, and in some cases, an output of the accelerometers or gyroscopes is provided to the display of computing device 600 to render immersive augmented reality or virtual reality.

Embodiments described herein support primitive fitting. The components described herein refer to integrated components of a primitive fitting system. The integrated components refer to the hardware architecture and software framework that support functionality using the primitive fitting system. The hardware architecture refers to physical components and interrelationships thereof and the software framework refers to software providing functionality that can be implemented with hardware embodied on a device.

In some embodiments, the end-to-end software-based system operates within the components of the primitive fitting system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
generating, by a global primitive fitting network comprising a first instance of a base architecture, a representation of global 3D primitives that approximate a global structure of a three-dimensional (3D) point cloud;
generating, by a local primitive fitting network comprising a second instance of the base architecture, a representation of local 3D primitives that approximate a local structure of a local patch of the 3D point cloud; and
generating a representation of a set of fitted 3D primitives for the 3D point cloud based on the representation of the global 3D primitives and the representation of the local 3D primitives.

2. The one or more computer storage media of claim 1, wherein the local primitive fitting network is configured to predict the representation of the local 3D primitive s from a first input representation of 3D points of the local patch and a second input representation of global contextual information generated by the global primitive fitting network.

3. The one or more computer storage media of claim 1, wherein the local patch includes a seed point, wherein the global primitive fitting network is configured to encode the 3D point cloud into an object latent vector and encode the seed point into a seed point feature vector, wherein the local primitive fitting network is configured to encode an input representation of 3D points of the local patch into a patch latent vector and decode a combined representation of the object latent vector, the seed point feature vector, and the patch latent vector into the representation of the local 3D primitives.

4. The one or more computer storage media of claim 1, the operations further comprising:
identifying, using a fine detail identification network, a pool of 3D points in the 3D point cloud predicted to represent fine detail; and
generating the local patch using the pool of 3D points.

5. The one or more computer storage media of claim 1, the operations further comprising:
downsampling the 3D point cloud to generate a downsampled 3D point cloud;

sampling a query point from the downsampled 3D point cloud; and generating the local patch by grouping a set of nearest neighbors of the query point from a full resolution of the 3D point cloud.

6. The one or more computer storage media of claim 1, wherein generating the representation of the set of fitted 3D primitives comprises aggregating and de-duplicating the global 3D primitives and the local 3D primitives based on maximizing intersections of points that are common to initial primitives that are assigned to a common one of the fitted 3D primitives.

7. The one or more computer storage media of claim 1, wherein generating the representation of the set of fitted 3D primitives comprises merging the global 3D primitives and the local 3D primitives and preventing merging of any of the local 3D primitives generated from the local patch of the 3D point cloud with another one of the local 3D primitives generated from the local patch.

8. The one or more computer storage media of claim 1, the operations further comprising identifying a first primitive type for a particular primitive in the set of fitted 3D primitives, the particular primitive having assigned points from the 3D point cloud, based on summing probabilities, generated by the global primitive fitting network and the local primitive fitting network, that each of the assigned points belongs to the first primitive type.

9. The one or more computer storage media of claim 1, wherein the representation of the set of fitted 3D primitives comprises, for at least one point in the 3D point cloud, a surface normal for the at least one point generated based on averaging a first surface normal generated for the at least one point by the global primitive fitting network and one or more surface normals generated for the at least one point by the local primitive fitting network.

10. A computerized method comprising:
generating, by a global primitive fitting network, a representation of global 3D primitives based on a global structure of a three-dimensional (3D) point cloud;
generating, by a local primitive fitting network, a representation of local 3D primitives based on a local structure of a local patch generated using a pool of 3D points of the 3D point cloud predicted to represent fine detail; and
generating a representation of a set of fitted 3D primitives for the 3D point cloud based on merging the global 3D primitives and the local 3D primitives.

11. The computerized method of claim 10, wherein the local primitive fitting network is configured to predict the representation of the local 3D primitives from a first input representation of 3D points of the local patch and a second input representation of global contextual information generated by the global primitive fitting network.

12. The computerized method of claim 10, wherein the local patch includes a seed point, wherein the global primitive fitting network is configured to encode the 3D point cloud into an object latent vector and encode the seed point into a seed point feature vector, wherein the local primitive fitting network is configured to encode an input representation of 3D points of the local patch into a patch latent vector and decode a combined representation of the object latent vector, the seed point feature vector, and the patch latent vector into the representation of the local 3D primitives.

13. The computerized method of claim 10, further comprising:
downsampling the 3D point cloud to generate a downsampled 3D point cloud;
sampling a query point from the downsampled 3D point cloud; and
generating the local patch by grouping a set of nearest neighbors of the query point from a full resolution of the 3D point cloud.

14. The computerized method of claim 10, wherein generating the representation of the set of fitted 3D primitives comprises aggregating and de-duplicating the global 3D primitives and the local 3D primitives based on maximizing intersections of points that are common to initial primitives that are assigned to a common one of the fitted 3D primitives.

15. The computerized method of claim 10, wherein generating the representation of the set of fitted 3D primitives comprises merging the global 3D primitives and the local 3D primitives and preventing merging of any of the local 3D primitives generated from the local patch of the 3D point cloud with another one of the local 3D primitives generated from the local patch.

16. The computerized method of claim 10, further comprising identifying a first primitive type for a particular primitive in the set of fitted 3D primitives, the particular primitive having assigned points from the 3D point cloud, based on summing probabilities, generated by the global primitive fitting network and the local primitive fitting network, that each of the assigned points belongs to the first primitive type.

17. The computerized method of claim 10, wherein the representation of the set of fitted 3D primitives comprises, for at least one point in the 3D point cloud, a surface normal for the at least one point generated based on averaging a first surface normal generated for the at least one point by the global primitive fitting network and one or more surface normals generated for the at least one point by the local primitive fitting network.

18. A computer system comprising:
one or more hardware processors and memory configured to provide computer program instructions, that, when used by the one or more hardware processors, cause the one or more hardware processors to perform operations comprising:
generating, by a global primitive fitting network, a representation of global 3D primitives corresponding to a global structure of a three-dimensional (3D) point cloud;
generating, by a local primitive fitting network based at least on global contextual information generated by the global primitive fitting network, a representation of local 3D primitives corresponding to a local structure of a local patch of the 3D point cloud; and
generating a representation of a set of fitted 3D primitives for the 3D point cloud based on aggregating and de-duplicating the global 3D primitives and the local 3D primitives.

19. The computer system of claim 18, the operations further comprising identifying a first primitive type for a particular primitive in the set of fitted 3D primitives, the particular primitive having assigned points from the 3D point cloud, based on summing probabilities, generated by the global primitive fitting network and the local primitive fitting network, that each of the assigned points belongs to the first primitive type.

20. The computer system of claim 18, wherein the representation of the set of fitted 3D primitives comprises, for at least one point in the 3D point cloud, a surface normal for the at least one point generated based on averaging a first surface normal generated for the at least one point by the global primitive fitting network and one or more surface normals generated for the at least one point by the local primitive fitting network.

* * * * *